United States Patent [19]

Harwell

[11] Patent Number: 5,129,926
[45] Date of Patent: Jul. 14, 1992

[54] ENGINE EXHAUST SYSTEM

[76] Inventor: James E. Harwell, 37 D St., Box 202, Fellows, Calif. 93224

[21] Appl. No.: 734,217

[22] Filed: Jul. 22, 1991

[51] Int. Cl.$^5$ .................. B01D 47/02; B01D 39/10
[52] U.S. Cl. ........................... 55/255; 55/186; 55/256; 55/259; 55/387; 55/503
[58] Field of Search ............... 55/248, 250, 255, 256, 55/257.1, 259, 316, 387, 186, 187, 503, 511, 521

[56] References Cited

U.S. PATENT DOCUMENTS

| | | | |
|---|---|---|---|
| 622,217 | 4/1899 | Fuller et al. | 55/503 X |
| 1,001,094 | 8/1911 | Torchiani | 55/255 |
| 1,223,101 | 4/1917 | Pacziga | 55/186 |
| 1,358,333 | 11/1920 | Rudloff | 55/255 X |
| 1,725,884 | 8/1929 | Reichert | 55/511 X |
| 1,814,582 | 7/1931 | Benkert et al. | 55/255 X |
| 1,964,794 | 7/1934 | Gilbert | 55/255 X |
| 2,068,858 | 1/1937 | Jones | 55/503 X |
| 2,083,649 | 6/1937 | Heglar | 55/255 X |
| 2,405,494 | 8/1946 | Dupuy | 55/255 X |
| 2,434,677 | 1/1948 | Stillman | 55/186 |
| 2,508,297 | 5/1950 | Ruth | 55/255 |
| 2,721,065 | 10/1955 | Ingram | 55/256 X |
| 2,789,032 | 4/1957 | Bagley et al. | 55/255 X |
| 2,911,289 | 11/1959 | Forry | 55/255 X |
| 3,216,181 | 11/1965 | Carpenter et al. | 55/256 |
| 3,296,997 | 1/1967 | Holby et al. | |
| 3,316,693 | 5/1967 | Fermor | 55/256 X |
| 3,391,521 | 7/1968 | Pal | 55/256 X |
| 3,476,524 | 11/1969 | Burke | 55/256 X |
| 3,566,583 | 3/1971 | Ashmore | 55/255 |
| 3,695,005 | 10/1972 | Yuzawa | 55/255 |
| 3,799,076 | 3/1974 | Graves | 55/256 X |
| 3,803,813 | 4/1974 | Yuzawa | 55/255 X |
| 3,844,748 | 10/1974 | Lanier | 55/255 |
| 4,300,924 | 11/1981 | Coyle | 55/255 X |
| 4,310,067 | 1/1982 | Thomson | 181/228 |
| 4,393,956 | 7/1983 | Tsukui et al. | 181/265 |
| 4,428,453 | 1/1984 | Yeun et al. | 181/231 |
| 4,917,640 | 4/1990 | Miles, Jr. | 181/260 X |
| 4,924,672 | 5/1990 | Sekiya et al. | 55/256 X |

*Primary Examiner*—Robert Spitzer
*Attorney, Agent, or Firm*—Henderson & Sturm

[57] ABSTRACT

An engine exhaust system for an internal combustion engine including a water-filled scrubber tank, a combustion gas diffuser tube disposed in the scrubber tank below a predetermined water level, a moisture trap attached to a gas outlet from the scrubber tank, and an activated charcoal filter disposed to receive the gases emitted from the moisture trap. A return line provides fluid communication between the moisture trap and the intake manifold of the engine to recycle moisture laden gases to increase engine performance and horsepower while minimizing harmful noise and chemical emissions.

10 Claims, 3 Drawing Sheets

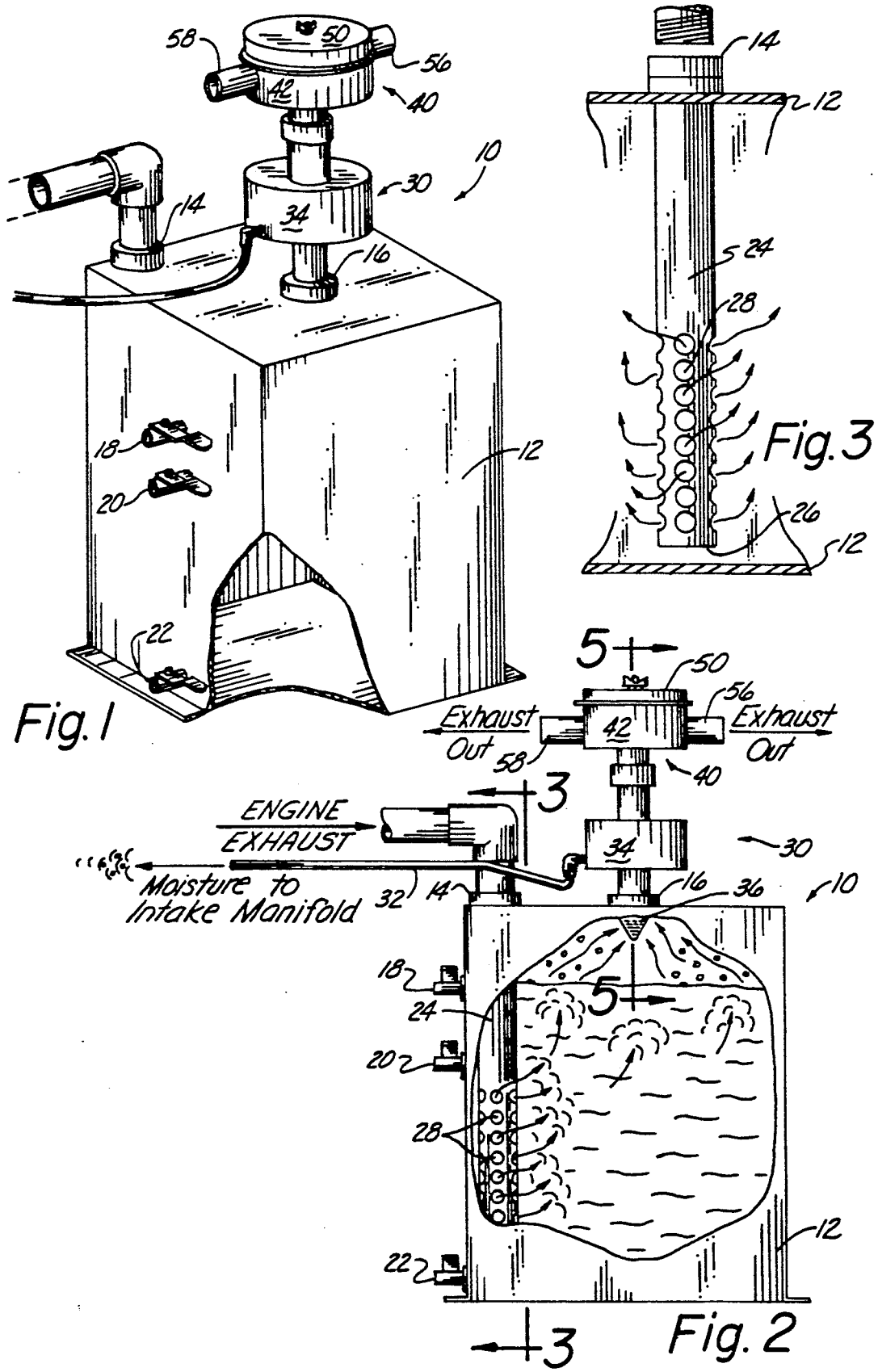

ENGINE EXHAUST SYSTEM

TECHNICAL FIELD

This invention relates to internal combustion engines, and more particularly to an engine exhaust system.

BACKGROUND ART

The pervasive use of the internal combustion engine has led to monumental problems with noise and are pollution that effect the quality of life. It is imperative that an effective and inexpensive means be found to reduce the harmful waste products generated by internal combustion engines--both stationary and those in present-day automobiles. Those concerned with these and other problems recognize the need for an improved engine exhaust system.

DISCLOSURE OF THE INVENTION

The present invention provides an engine exhaust system for an internal combustion engine including a water-filled scrubber tank, a combustion gas diffuser tube disposed in the scrubber tank below a predetermined water level, a moisture trap attached to a gas outlet from the scrubber tank, and an activated charcoal filter disposed to receive the gases emitted from the moisture trap. A return line provides fluid communication between the moisture trap and the intake manifold of the engine to recycle moisture-laden gases to increase engine performance and horsepower while minimizing harmful noise and chemical emissions.

An object of the present invention is the provision of an improved engine exhaust system.

Another object is to provide an engine exhaust system that minimizes both noise and chemical emissions.

A further object of the invention is the provision of an engine exhaust system that is durable and easy to maintain.

Still another object is to provide an engine exhaust system that has an uncomplicated structure and is inexpensive to manufacture.

A still further object of the present invention is the provision of an engine exhaust system that enhances engine performance.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view showing the engine exhaust system of the present invention;

FIG. 2 is a side elevational view with portions cut away to illustrate the operation of the engine exhaust system;

FIG. 3 is a sectional view taken along line 3—3 of FIG. 2 illustrating the diffuser tube;

BEST MODE FOR CARRYING OUT THE INVENTION

Figure 4:
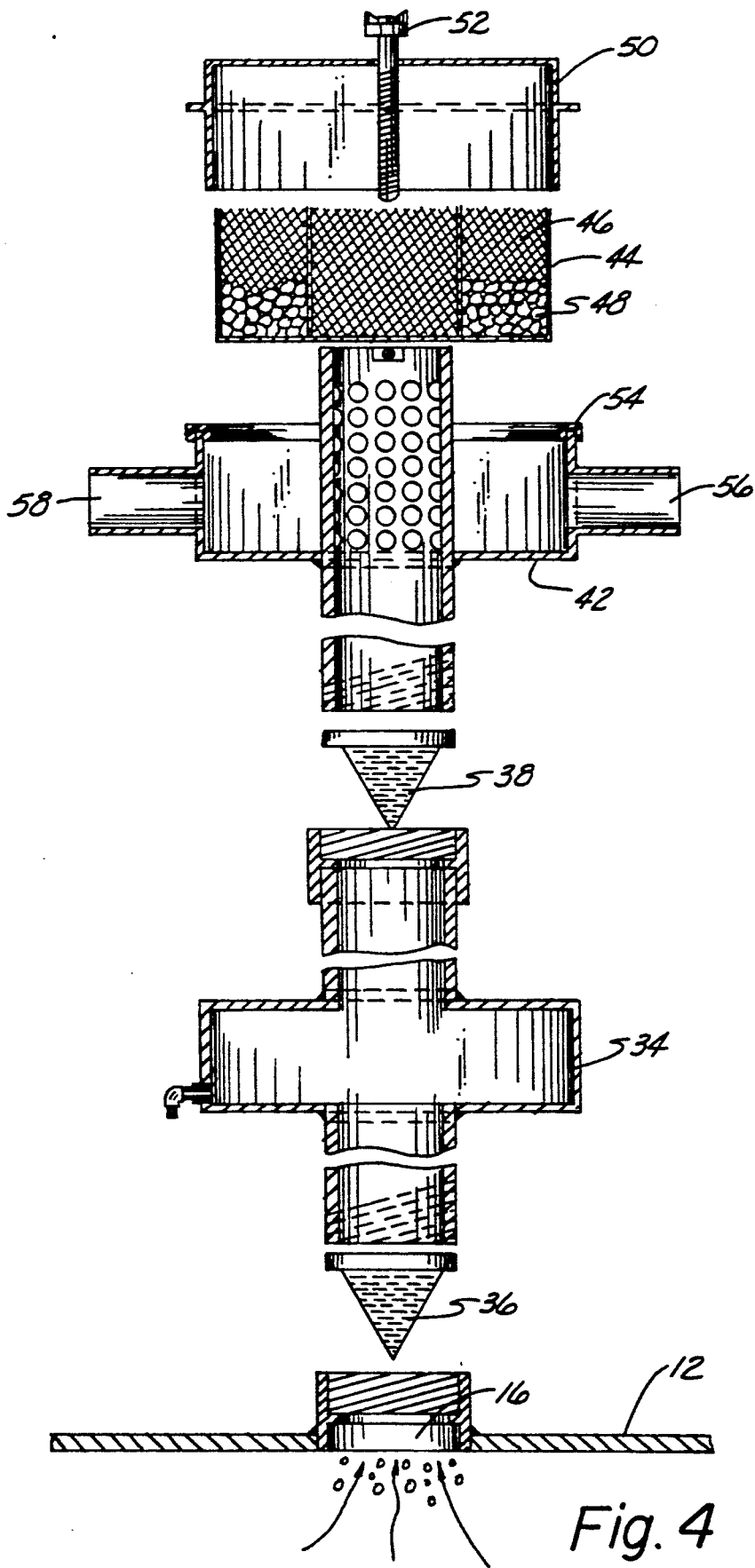
FIG. 4 is an enlarged exploded sectional view illustrating the arrangement of the components of the moisture trap and the activated charcoal filter.

Referring now to the drawings, wherein like reference numerals designate identical or corresponding parts throughout the several view, FIG. 1 shows the engine exhaust system (10) of the present invention. The exhaust system (10) includes a scrubber tank (12) having a gas inlet (14) and a gas outlet (16) formed in the top; and a water inlet (18), water outlet (20), and water drain (22) formed in one of the sidewalls.

As best shown in FIG. 2, a diffuser tube (24) is attached to and extends downwardly from the gas inlet (14). Engine exhaust or combustion gas from the exhaust gas outlet of an internal combustion engine is received into the diffuser tube (24). The lower discharge end (26), including a number of openings (28), is disposed below the predetermined water level in the scrubber tank (12) so that combustion gas exits the diffuser tube (24) in a dispersed pattern and moves upwardly through the water to the gas outlet (16). The gas continues to move upwardly through a moisture trap (30) and a filter assembly (40). A quantity of moisture-laden gas is recycled to the intake manifold of the engine through a zinc return line (32), and the remainder of the gas moves up through the filter (40) and is discharged into the atmosphere.

Figure 5:
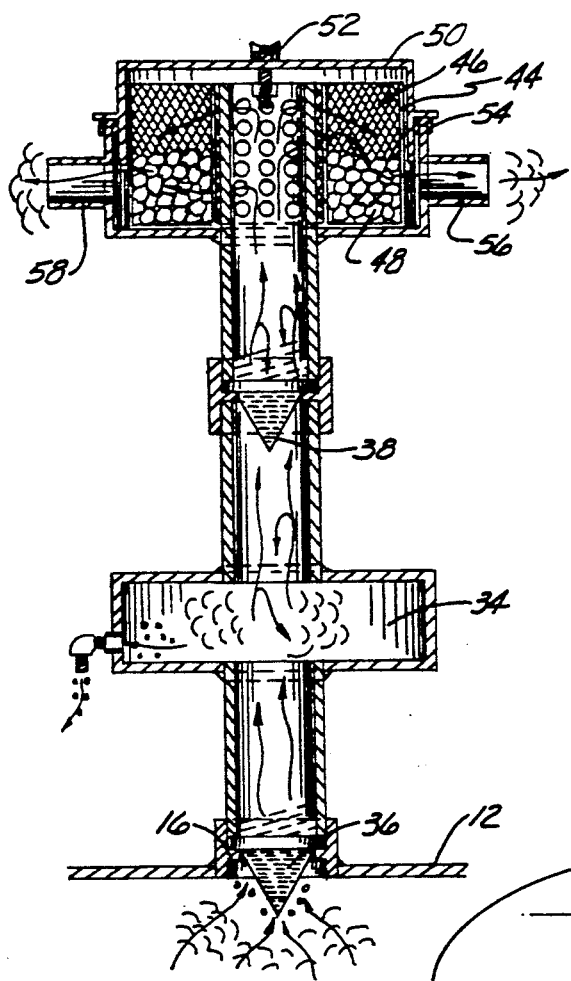
FIG. 5 is an enlarged sectional view taken along line 5—5 of FIG. 3.
Figure 6:
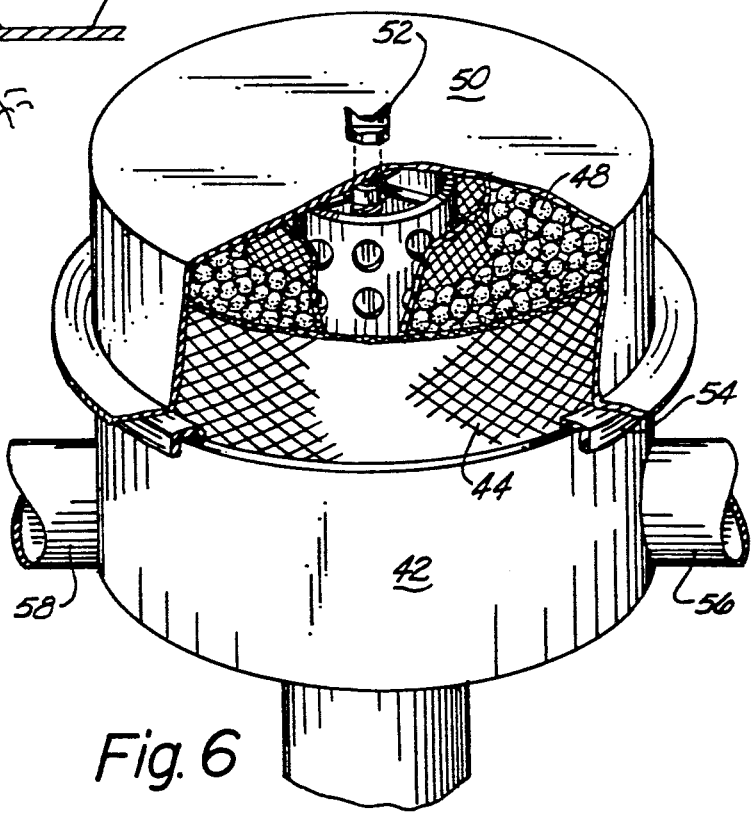
FIG. 6 is an enlarged perspective view of the filter with portions cut away to show the perforate basket and charcoal.

As most clearly shown in FIGS. 4 and 5, the moisture trap (30) includes a central chamber (34) and a pair of fine mesh stainless steel cones (36, 38). The cones (36, 38) are spaced in a vertical pipe above and below the central chamber (34) to allow entrained moisture to drip directly down into the scrubber tank (12). The filter assembly (40) includes a lower casing (42) and a perforate basket (44) disposed within the casing (42). The basket (44) includes an annular channel (46) that receives a quantity of activated charcoal (48). A removable cap (50) is secured to the casing (42) by a threaded bolt (52). A seal (54) is disposed at the juncture of the casing (42) and the cap (50) so that the gases move out oppositely directed gas exit ports (56, 58).

In operation the scrubber tank (12) is connected to a water supply at the water inlet (18) and the tank (12) is filled to a predetermined level. Make up water may be required periodically if the water of combustion is insufficient to maintain the predetermined water level. Also, the water outlet (20) may be utilized to provide for water circulation while maintaining the water level.

The upper end of the diffuser tube (24) is connected to the exhaust gas outlet of an internal combustion engine by conventional means. The internal combustion engine may be either of the spark ignition or compression ignition type, and may be either stationary or mobile. Combustion gases travel upward through the water and exit the gas outlet (16) as illustrated in FIG. 2. A portion of the moisture-laden gas is recycled to the intake manifold of the engine to enhance engine performance, and the balance of the gases travel upwardly through the activated charcoal filter (40) before they are vented to the atmosphere.

Thus, it can be seen that at least all of the stated objectives have been achieved.

Obviously, many modifications and variations of the present invention are possible in light of the above teachings. It is therefore to be understood, that within the scope of the appended claims, the invention may be practiced otherwise than as specifically described.

I claim:

1. An engine exhaust system for an internal combustion engine including an intake manifold and an exhaust gas outlet, the improvement comprising:
   a scrubber tank disposed to hold a predetermined level of water, the scrubber tank including a water inlet, a gas inlet disposed above the water level and disposed to receive combustion gases from the exhaust gas outlet of the engine, and a gas outlet disposed above the water level;
   a diffuser tube attached to the gas inlet and having a lower discharge end disposed within the scrubber tank below the water level such that combustion gases exiting the discharge end pass upwardly through the water to the gas outlet;
   a moisture trap attached to the gas outlet, the moisture trap including a central chamber having a return line disposed in fluid communication with the intake manifold of the engine, and fine mesh screen cones disposed below and above the central chamber such that gases moving upwardly through the moisture trap come in direct contact with the mesh cones; and
   a filter attached to and disposed above the moisture trap in direct fluid communication therewith, the filter including an activated charcoal element through which the gases travel before exiting the filter into the atmosphere.

2. The exhaust system of claim 1 wherein the scrubber tank further includes a water outlet disposed below the water inlet such that water may be circulated through the scrubber tank while maintaining the predetermined water level.

3. The exhaust system of claim 1 wherein the scrubber tank further includes a water drain disposed at the bottom of the scrubber tank.

4. The exhaust system of claim 1 wherein the lower discharge end of the diffuser tube includes a plurality of openings to allow combustion gases to exit the diffuser tube in a dispersed pattern.

5. The exhaust system of claim 1 wherein the fine mesh screen cones are spaced in a vertical pipe to allow entrained moisture to drip directly down into the scrubber tank.

6. The exhaust system of claim 5 wherein the fine mesh screen cones are constructed of stainless steel.

7. The exhaust system of claim 1 wherein the return line connecting the moisture trap and the intake manifold is constructed of zinc.

8. The exhaust system of claim 1 wherein the filter includes a lower casing, a perforate basket disposed within the lower casing, a removable cap sealingly attached to the lower casing, and a pair of oppositely directed gas exit ports extending horizontally from the lower casing.

9. The exhaust system of claim 8 wherein the perforate basket includes an annular channel disposed to receive a supply of activated charcoal.

10. The exhaust system of claim 9 wherein the removable cap is secured in position by a threaded bolt.

* * * * *